US009787112B2

(12) United States Patent
Sukup et al.

(10) Patent No.: US 9,787,112 B2
(45) Date of Patent: Oct. 10, 2017

(54) INTER-PROTOCOL CHARGING ADAPTER

(71) Applicant: Tesla Motors, Inc., Palo Alto, CA (US)

(72) Inventors: Martin Sukup, Stanford, CA (US);
Troy A. Nergaard, Seattle, WA (US);
Kristoffer J. Donhowe, Mountain View, CA (US)

(73) Assignee: Tesla, Inc., Palo Alto, CA (US)

( * ) Notice: Subject to any disclaimer, the term of this patent is extended or adjusted under 35 U.S.C. 154(b) by 185 days.

(21) Appl. No.: 14/780,073

(22) PCT Filed: Apr. 2, 2013

(86) PCT No.: PCT/US2013/034923
§ 371 (c)(1),
(2) Date: Sep. 25, 2015

(87) PCT Pub. No.: WO2014/163618
PCT Pub. Date: Oct. 9, 2014

(65) Prior Publication Data
US 2016/0036256 A1    Feb. 4, 2016

(51) Int. Cl.
*H02J 7/00*    (2006.01)
(52) U.S. Cl.
CPC .......... *H02J 7/0042* (2013.01); *H02J 7/0052* (2013.01); *H02J 2007/006* (2013.01)
(58) Field of Classification Search
CPC ....... Y02E 60/12; H02J 7/0042; H02J 7/0045; H01M 10/46; H01M 10/44
USPC ....................................................... 320/107
See application file for complete search history.

(56) References Cited

U.S. PATENT DOCUMENTS

| 2005/0242768 A1* | 11/2005 | Pandit | H02J 7/0018 320/107 |
|---|---|---|---|
| 2010/0198287 A1* | 8/2010 | Neumiller | A61N 1/3931 607/5 |
| 2012/0095519 A1* | 4/2012 | Parramon | A61N 1/37241 607/2 |

(Continued)

FOREIGN PATENT DOCUMENTS

| CN | 102341988 A | 2/2012 |
|---|---|---|
| CN | 102917909 A | 2/2013 |
| JP | 2008178278 A | 7/2008 |

(Continued)

OTHER PUBLICATIONS

International preliminary report on patentability in application PCT/US2013/034923, Oct. 15, 2015, 10 pages.

(Continued)

*Primary Examiner* — Arun Williams
(74) *Attorney, Agent, or Firm* — Garlick & Markison; Bruce E. Garlick

(57) ABSTRACT

An inter-protocol charging adapter for equipment to be charged via a bus includes: first connectors corresponding to a first charging protocol that requires the bus to be energized before the equipment closes onto the bus; second connectors corresponding to a second charging protocol that does not energize the bus before the equipment closes onto the bus; and a boost converter coupled to the bus and to at least one of the second connectors, wherein the boost converter uses energy from the second connector to energize the bus before the equipment closes onto the bus.

16 Claims, 4 Drawing Sheets

(56) References Cited

U.S. PATENT DOCUMENTS

2013/0020993 A1    1/2013   Taddeo

FOREIGN PATENT DOCUMENTS

| WO | 2012106372 A2 | 8/2012 |
| WO | 2012111081 A1 | 8/2012 |
| WO | WO 2012106372 | 8/2012 |

OTHER PUBLICATIONS (R) SAE Electric Vehicle Conductive Charge Coupler J1772 11, EV Charging Systems Committee, Oct. 1, 1996, 32 pages.

Takafumi Anegawa: 11 Safety Design of CHAdeMO Quick Charger and its impact on Power Grid, retrieved from the internet: http://www.ev-charging-infrastructure.com/media/downloads/inline/takafumi-anegawa-tepco-11-20.1290790915.pdf, Dec. 1, 2010, 20 pages.

Chademo Association: "CHAdeMO connector Interface", retrieved from the internet: http://www.chademo.com/pdf/interface.pdf, Jan. 1, 2010, 6 pages.

Anegawa: Safety Design of CHAdeMO Quick Charging System; World Electric Vehicle Journal, WEVA; Nov. 5, 2010; vol. 4; pp. 855-859 (online) retrieved Feb. 16, 2017 [http://evs24.org@wevajournal/php/download.ph/?f=vol4/WEVA4-4120.pdf].

Japan Patent Office; Notification of Reasons for Refusal; JP Application No. 2015-506300; Feb. 28, 2017.

* cited by examiner

INTER-PROTOCOL CHARGING ADAPTER

BACKGROUND

Rechargeable energy storage systems are used in many different fields. One type of such implementations is electric vehicles, where a battery pack is used to provide energy to an electric motor that drives one or more wheels of the vehicle. For example, the battery pack is made of one or more cells storing the electric energy until it is used. From time to time, additional energy must be added to the energy storage system. To some extent, this can be done by regenerative braking (or "regen"), which involves converting the vehicle's kinetic energy back into electric form. Another way to replenish the electric energy level is to connect an outside power source (e.g., a DC generator) to the energy storage system. Such a power source is sometimes referred to as electric-vehicle supply equipment (EVSE).

At a general level, each EVSE operates according to the following broad steps: first, connecting equipment (e.g., a plug) is brought in physical contact with the vehicle; then, a logical handshaking process is performed to exchange the necessary information between the vehicle and the EVSE (e.g., how much energy is currently stored in the vehicle, and/or the capacity of the EVSE); finally, one or more contactors in the vehicle are closed so that there is electrical connection between the EVSE's charging conduit (sometimes called a "bus") and the vehicle's battery system. This last step is the point when electric energy begins to flow from the EVSE into the vehicle for recharging the battery pack.

More particularly, however, each type of EVSE can operate according to any of multiple different protocols for charging of electric vehicles. One such example is the SAE J1772 standard which was established by SAE International. In particular, the protocol for DC charging under the SAE J1772 standard specifies that the bus must be energized (i.e., must be at a certain voltage level) by the time the contactors close onto the bus.

Another example of a charging protocol is CHAdeMO, which was established by a number of Japanese companies. In contrast to the SAE J1772 DC-charging protocol, CHAdeMO expects the bus to be non-energized (i.e., to be at zero volts) by the time the contactors close onto the bus. That is, the CHAdeMO EVSE does not energize the bus before the vehicle closes its contactor onto the bus.

Some electric vehicles (or other rechargeable electric equipment) operate according to another charging protocol than the examples mentioned above. For example, Tesla Motors has created a charging protocol that is not identical to any other charging protocol on the market. However, like the SAE J1772 charging protocol, the Tesla Motors charging protocol requires the bus to be at the appropriate voltage level by the time the contactors close.

SUMMARY OF THE INVENTION

In a first aspect, an inter-protocol charging adapter for equipment to be charged via a bus includes: first connectors corresponding to a first charging protocol that requires the bus to be energized before the equipment closes onto the bus; second connectors corresponding to a second charging protocol that does not energize the bus before the equipment closes onto the bus; and a boost converter coupled to the bus and to at least one of the second connectors, wherein the boost converter uses energy from the second connector to energize the bus before the equipment closes onto the bus.

In a second aspect, a method of adapting between charging protocols for equipment to be charged via a bus includes: coupling a bus between a charging system and the equipment to be charged, wherein the equipment conforms to a first charging protocol that requires the bus to be energized before the equipment closes onto the bus, and wherein the charging system conforms to a second charging protocol that does not energize the bus before the equipment closes onto the bus; drawing energy from an analog control line of the charging system; and energizing the bus using the drawn energy before the equipment closes onto the bus.

Implementations can include any or all of the following features. The inter-protocol charging adapter further includes a processor that triggers the boost converter to energize the bus. The processor is configured to perform handshaking between the equipment and charging equipment, the charging equipment coupled to the second connectors. The second charging protocol uses a charger start/stop connector to send a start-of-charging signal, and wherein the boost converter obtains the energy from the charger start/stop connector. The inter-protocol charging adapter further includes a diode in the bus. The inter-protocol charging adapter is incorporated in a single housing. The inter-protocol charging adapter is distributed over at least two housings connected by a cable. Handshaking is performed between the equipment and the charging equipment before the equipment closes onto the bus. The analog control line includes a charger start/stop connector. The charging equipment is configured for dual-wire CAN communication and the vehicle is configured for single-wire CAN communication, the adapter further comprising: a dual wire CAN component coupled to the at least two CAN connectors, and a single wire CAN component coupled to the vehicle, and the processor translates between dual-wire CAN communications and single-wire CAN communications.

In a third aspect, an inter-protocol charging adapter for a vehicle to be charged via a bus includes: first connectors corresponding to a first charging protocol that requires the bus to be energized before the vehicle closes onto the bus, the first connectors including: (i) at least two power supplies coupled to a battery of the vehicle, (ii) a ground, (iii) a proximity connector, and (iv) a pilot connector; second connectors corresponding to a second charging protocol that does not energize the bus before the vehicle closes onto the bus, the second connectors including: (i) at least two power supplies coupled to a charging system and to the bus, (ii) a ground connector, (iii) at least two charger start/stop connectors, (iv) a proximity connector, (v) a charging start/stop connector, and (vi) at least two controller area network (CAN) connectors; a boost converter coupled to the bus and to at least one of the charger start/stop connectors; and a processor that causes the boost converter to draw energy from the charger start/stop connector and use the drawn energy to energize the bus before the vehicle closes onto the bus.

DETAILED DESCRIPTION

This document describes devices, systems and techniques that can be used for adapting between charging protocols. In some implementations, an adapter is provided between an EVSE using the CHAdeMO protocol and an electric vehicle that operates using a charging protocol that requires the bus to be up (e.g., SAE J1772 or the Tesla Motors protocol) before the vehicle closes onto the bus. Stated more generally, an adapter can bridge the gap between an EVSE that expects the vehicle to energize the cable, and a vehicle that expects the EVSE to energize the cable. The adapter can use a high-voltage boost converter to control the bus voltage, and the adapter can draw its energy from the EVSE.

This description mentions electric cars as examples of equipment that uses rechargeable energy storage systems. However, the description likewise applies to rechargeable energy storage systems used in any other type of equipment or device, including, but not limited to, motorcycles, scooters, buses, trams, trains, boats, lighting equipment, tools and mobile electronic devices, to name just a few examples.

Also, battery packs are mentioned as examples of rechargeable energy storage systems. Rechargeable energy storage systems can include any of multiple different rechargeable configurations and cell chemistries including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other chargeable high energy storage type or configuration, to name just a few examples.

Figure 1:
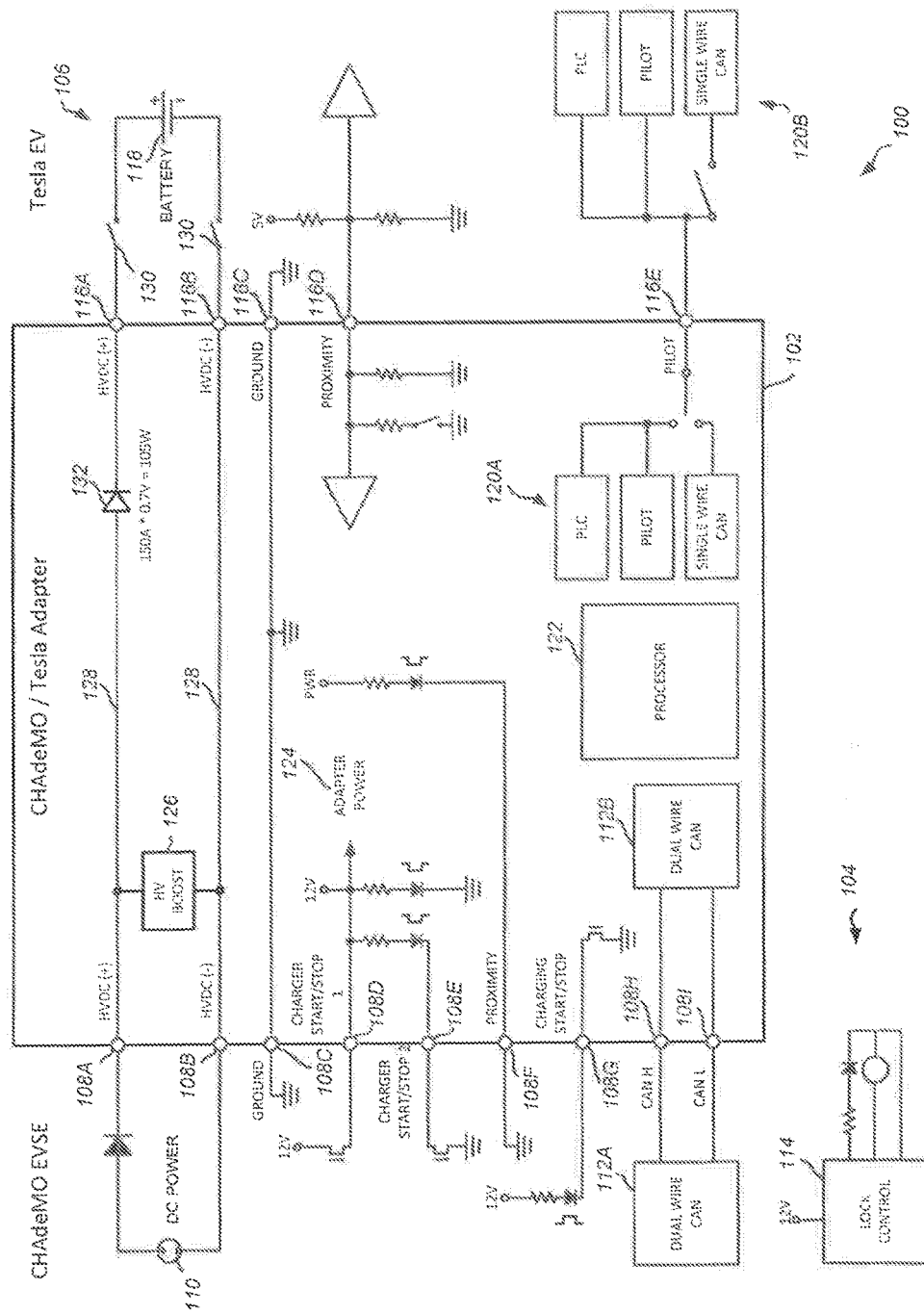
FIG. 1 shows an example schematic of an inter-protocol adapter.

FIG. 1 shows an example schematic 100 of an inter-protocol adapter 102. Here, the adapter is labeled "CHAdeMO/Tesla Adapter" to indicate that this example concerns adapting between the respective CHAdeMO and Tesla Motors charging protocols. Generally, the labels "CHAdeMO" and "Tesla" in this and other examples are for illustrative purposes only. In other implementations, adaptation can be done between charging protocols that include only one, or none, of the CHAdeMO and Tesla Motors charging protocols.

An EVSE is generally indicated by reference number 104, and an electric vehicle is generally indicated by references number 106. The current description focuses on certain components involved in performing the charging protocol(s), and, for clarity, some other components are therefore not illustrated. For example, the EVSE 104 can be implemented in a charging station (e.g., located along a highway or in another public space), and the electric vehicle can be an electric car of any type (e.g., a roadster, coupe, sedan, wagon, sport utility vehicle, truck or minivan).

Reference numbers 108A-I schematically represent connectors where the EVSE 104 and the adapter 102 are connected. In this example, the connectors 108A-I conform to the CHAdeMO charging protocol. At a high level, the connectors 108A-B can be considered power lines, connectors 108C-G can be considered analog control lines, and connectors 108H-I can be considered a digital communication bus.

For example, connectors 108A and B are high-voltage power supplies (referred to as HVDC (+) and HVDC (−), respectively) coupled to a DC power source 110; connector 108C is ground; connectors 108D and E are charger start/stop connectors (referred to as one and two, respectively); connector 108F is a proximity connector that helps immobilize the vehicle during charging; connector 108G is a charging start/stop connector; and connectors 108H and I are controller area network (CAN) connectors (referred to as H and L, respectively) coupled to a dual wire CAN component 112A in the EVSE, wherein the adapter has a corresponding dual wire CAN component 112B. The EVSE here also includes a lock control 114 that is used for physically locking the EVSE (e.g., the charging plug thereof) and the adapter to each other.

Reference numbers 116A-E schematically represent connectors where the inter-protocol adapter 102 and the electric vehicle 106 are connected. In this example, the connectors 116A-E conform to the Tesla Motors charging protocol. For example, the connectors 116A and B are high-voltage power supplies (referred to as HVDC (+) and HVDC (−), respectively) coupled to a battery 118; connector 116C is ground; connector 116D is a proximity connector; and connector 116E is a pilot connector that couples power line communication (PLC), pilot and single wire CAN components 120A in the adapter to corresponding components 120B in the vehicle.

The adapter also includes a processor 122 that controls one or more of the adapter's operations. Adapter power 124 can be provided to the adapter from the EVSE, such as through the charger start/stop connector 108D. The adapter here includes a high-voltage boost converter 126 that controls voltage on a bus 128 between the power supply connectors 108A-B and 116A-B. The vehicle 106 has one or more contactors 130 to the bus. The bus can have a diode 132 thereon.

The following are examples of operations that can be performed using the EVSE 104, inter-protocol adapter 102 and electric vehicle 106. After a user (e.g., a vehicle owner) presses a Start button (not shown) on the EVSE 104, the EVSE can send a start-of-charging signal on the connector 108D (e.g., a charger start/stop relay can be closed). Among other things, this can provide the adapter power 124 to the adapter.

After the start-of-charging signal is received, the processor 122 can perform initial handshaking. The handshaking depends on the protocol(s) involved and can be different depending on the implementation. Ultimately, the handshaking is performed between the EVSE 104 and the vehicle 106, but the adapter 102 can perform the handshaking function that each component expects. In other words, the adapter mimics the device that the handshaking is intended to interact with, and performs an interpreting function to bridge the different protocols. To name just some examples, the vehicle can transmit parameters to the EVSE (e.g., using the pilot connector 116E and the CAN connectors 108H-I) such as voltage limit, maximum current and/or battery system capacity, and the EVSE can indicate its maximum output voltage and maximum output to the vehicle (e.g., using the CAN connectors 108H-I and the pilot connector 116E).

After the initial handshaking, the inter-protocol adapter 102 brings up the bus 128 to match the voltage of the vehicle 106. In some implementations, the processor 122 receives voltage information from the vehicle and then activates the boost converter 126 to put approximately the same voltage level on the bus. For example, the boost converter can take one voltage from the adapter power 124 (e.g., 12V) and convert it to a higher voltage (e.g., 50-500V or more).

The boost converter 126 includes circuitry and/or components designed to receive a first voltage (e.g., from the charger start/stop one connector 108D) as input and output a second, higher, voltage (e.g., the voltage energizing the bus 128) as output. In some implementations, the boost converter includes at least two semiconductor components and an energy storage element, wherein the semiconductor devices are operated so that voltage of the storage element is added to the input voltage for output.

After the bus 128 is up, the vehicle 106 recognizes the matched voltage and closes the contactor(s) 130 onto the bus. Once the vehicle closes its contactors, the boost converter 126 is turned off. At this point, the voltage on the bus is that from the battery 118.

The EVSE 104 recognizes the voltage on the bus 128 (i.e., the voltage provided by the battery 118) and supplies the requested current using the DC power supply 110.

That is, the processor 122 performs interpreter functions between the EVSE 104 and the electric vehicle 106, and controls and monitors low-voltage inputs/outputs (e.g., the connectors 108D-G on the EVSE side and the connector 116D on the vehicle side) and communication busses (e.g., the connectors 108H-I and the connector 116E). For example, this can allow the adapter to simultaneously meet requirements of both systems (e.g., a CHAdeMO charging system and an SAE J1772 rechargeable device).

As another example, when the EVSE 104 is configured for dual-wire CAN communication and the vehicle 106 is configured for single-wire CAN communication, the processor 122 can translate between dual-wire CAN communications and single-wire CAN communications.

The diode 132 can provide additional robustness. In some implementations, the diode protects the vehicle 106 from closing the contactor(s) 130 onto an undetected low resistance across the bus 128. In normal operation, the diode does not significantly alter the electrical characteristics of the bus. For example, the diode can have a voltage drop of 0.7V, which at a current of 150 A represents 105 W of power. The diode can include one or more semiconductor components.

In this example, the inter-protocol adapter uses the EVSE 104 to obtain the adapter power 124 (i.e., by drawing power from the charger start/stop one relay through the connector 108D). In other implementations, the adapter can instead or in addition obtain power using one or more other connections. For example, and without limitation, the power can come from an AC plug, the vehicle 106 (e.g., the battery 118) or another battery (not shown).

Figure 2:
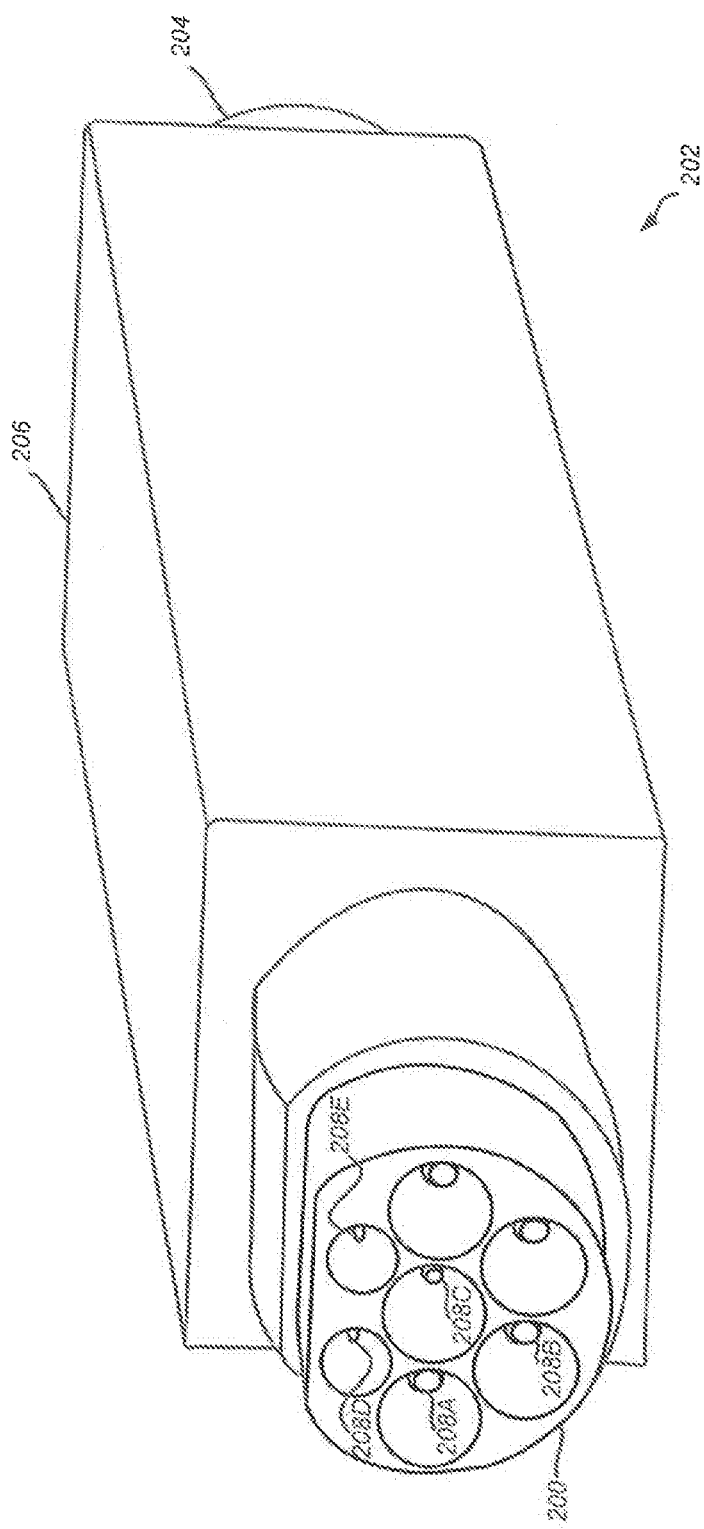
FIG. 2 shows an elevation view of a first end of an example inter-protocol adapter.

FIG. 2 shows an elevation view of a first end 200 of an example inter-protocol adapter 202. In the illustrated embodiment, the first end is compatible with the charging port used on certain Tesla Motors vehicles. Particularly, the first end is a three-phase "type 2" connector according to the standard IEC 62196-2. The inter-protocol adapter has a second end 204 that will be exemplified below.

In this example, the first end 200 and the second end 204 are mounted on a housing 206. The respective ends and the housing of the adapter can be manufactured from any appropriate material using any suitable technique. In some implementations, the component(s) can be molded (as one or more pieces) from plastic or another polymer. For example, and without limitation, the first and second ends can be manufactured as a separate parts that are then joined to the main body housing. The circuitry (e.g., the components of the adapter 102 in FIG. 1) can then be located essentially inside the housing, with contacts extending through the respective first and second end for connecting with external equipment (e.g., an EVSE or a vehicle).

The first end 200 has connectors 208A-E. In some implementations, the connectors correspond to the respective connectors 116A-E (FIG. 1). For example, the connectors include power supply connectors 208A and B, a ground connector 208C, a proximity connector 208D and a pilot connector 208E. When the inter-protocol adapter 202 is attached to the vehicle (e.g., "plugged in"), the connectors 208A-E provide the appropriate coupling between vehicle components and components in the adapter.

In this example, the first end 200 and the second end 204 are located on essentially opposite ends of the adapter 202. This configuration can be convenient for using the adapter, in that the first end can be fitted into a charging port of the equipment to be charged (e.g., a vehicle) and the second end provides an interface for attaching (e.g., plugging in) a connector of some EVSE. For example, when a vehicle uses the SAE J1772 (or the Tesla Motors) charging protocol, and the EVSE uses a charging protocol that does not energize the bus before contactor closing (e.g., CHAdeMO), the EVSE connector is plugged into the adapter, and the adapter itself is plugged into the vehicle.

Figure 3:
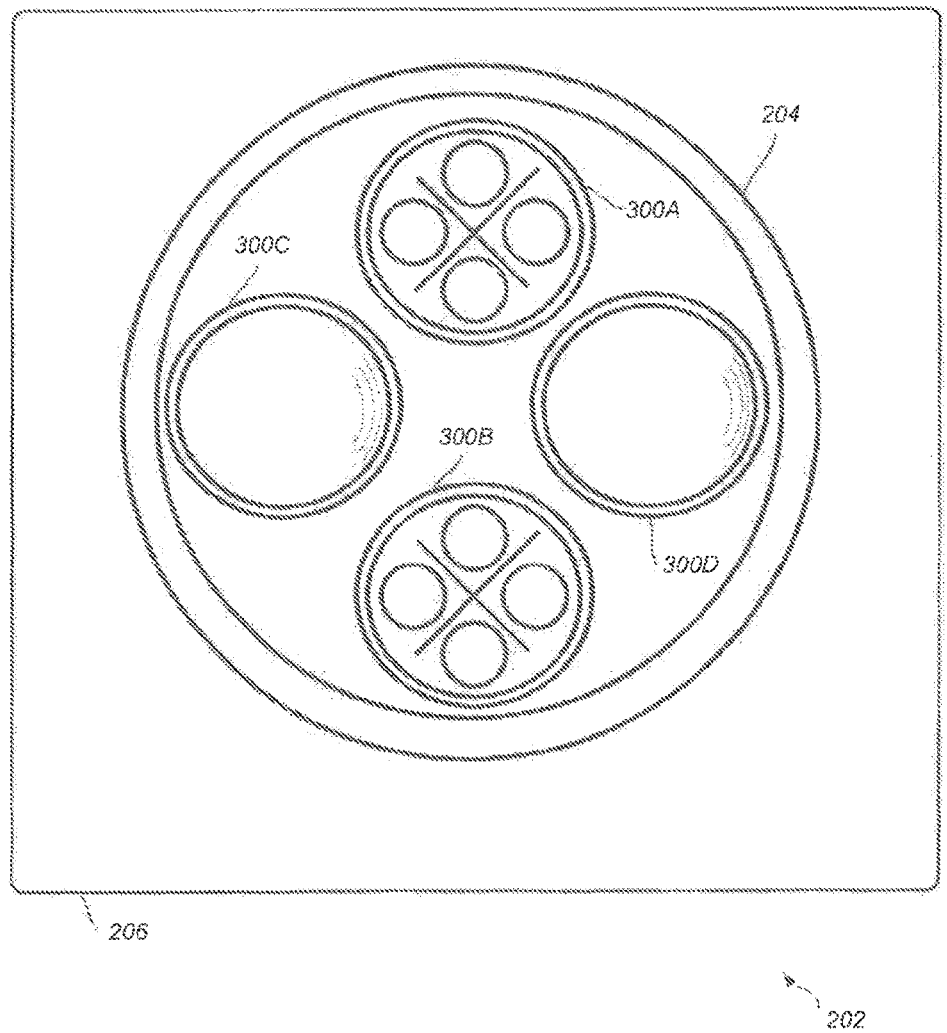
FIG. 3 shows an elevation view of the second end of the example inter-protocol adapter in FIG. 2.

FIG. 3 shows an elevation view of the second end 204 of the example inter-protocol adapter 202 in FIG. 2. Here, the housing 206 is partially visible. The second end includes connector ports 300A-D that facilitate receiving of an EVSE connector (here, a CHAdeMO connector). Each connector port can be designated for one or more of the connectors. Here, for example, the connector port 300A includes respective ground, charger start/stop one and charging enable/disable connectors; the connector port 300B includes respective connection check, CAN-H, CAN-L and charger start/stop two connectors; and the connector ports 300C and D include the respective positive and negative high-voltage power supplies.

Figure 4:
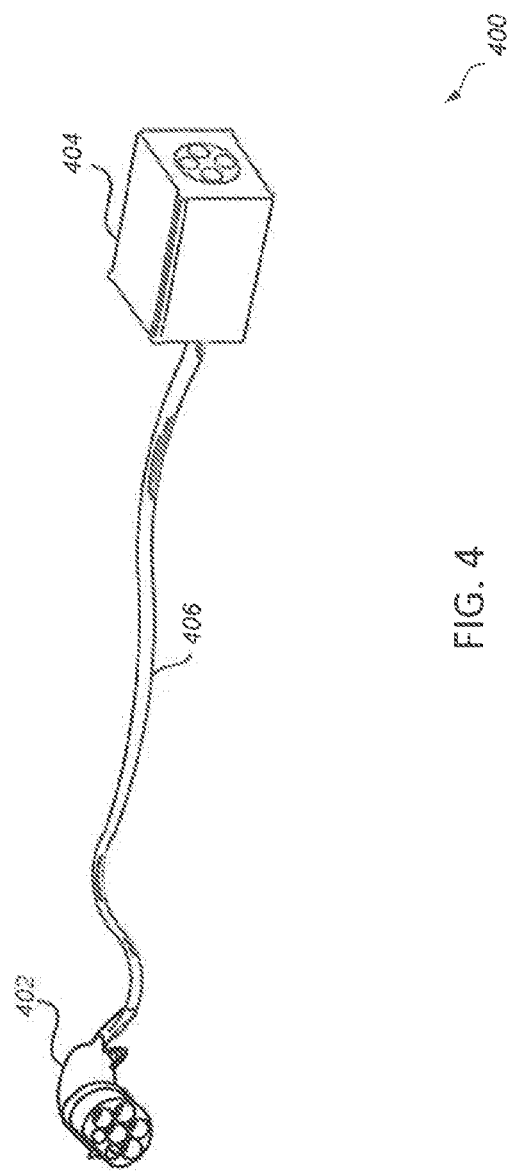
FIG. 4 shows an elevation view of another example inter-protocol adapter.

In the above example, the connectors corresponding to one charging protocol (e.g., the SAE J1772 connectors) and the connectors for another charging protocol (e.g., CHAdeMO) were included in the same general housing (which can, for example, be made of a rigid or semi-rigid material). In other implementations, however, two or more housings can be used for various parts of an adapter. FIG. 4 shows an elevation view of another example inter-protocol adapter 400. The adapter includes a first connector 402 coupled to a second connector 404 by a cable 406. In this implementation, the first connector 402 operates according to the Tesla Motors charging protocol (and is designed to fit a Tesla Motors charging port), whereas the second connector 404 operates according to the CHAdeMO charging protocol (and is designed to receive a CHAdeMO charging plug).

In use, the first connector 402 can be plugged into a charge port of equipment to be charged (e.g., a vehicle), which charge port is located some distance above ground (e.g., on the vehicle body). The length of the cable 406 allows the second connector 404 to be placed some distance away from the equipment (e.g., on the ground) before, during and/or after the CHAdeMO plug is inserted. For example, the cable can be approximately 4-5 feet long.

The circuitry and other components of the inter-protocol adapter 400 can be essentially all located in the first connector 402, or essentially all located in the second connector 404, or can be distributed in both of the connectors. Referring again briefly to FIG. 1, the components of the adapter 102 can be located in the second connector 404 (e.g., the CHAdeMO receiver), except for the connectors 116A-E which can be located in the first connector 402. That is, the cable 406 can provide the coupling between, on one hand, the processor and other adapter components, and, on the other hand, the connectors compatible with the SAE J1772 standard.

The cable 406 can be manufactured from any suitable material(s). For example, the cable can include five wires, each corresponding to one of the connectors 116A-E (FIG. 1). As another example, the cable can include nine wires, each corresponding to one of the connectors 108A-I (FIG. 1). Other numbers of wires or conduits can be used in some implementations.

A number of implementations have been described as examples. Nevertheless, other implementations are covered by the following claims.

What is claimed is:

1. An inter-protocol charging adapter for equipment to be charged via a bus, the adapter comprising:
    first connectors corresponding to a first charging protocol that requires the bus to be energized before the equipment closes onto the bus;
    second connectors corresponding to a second charging protocol that does not energize the bus before the equipment closes onto the bus; and
    a boost converter coupled to the bus and to at least one of the second connectors, wherein the boost converter uses energy from the second connector to energize the bus before the equipment closes onto the bus.

2. The inter-protocol charging adapter of claim 1, further comprising a processor that triggers the boost converter to energize the bus.

3. The inter-protocol charging adapter of claim 2, wherein the processor is configured to perform handshaking between the equipment and charging equipment, the charging equipment coupled to the second connectors.

4. The inter-protocol charging adapter of claim 1, wherein the second charging protocol uses a charger start/stop connector to send a start-of-charging signal, and wherein the boost converter obtains the energy from the charger start/stop connector.

5. The inter-protocol charging adapter of claim 1, further comprising a diode in the bus.

6. The inter-protocol charging adapter of claim 1, incorporated in a single housing.

7. The inter-protocol charging adapter of claim 1, distributed over at least two housings connected by a cable.

8. A method of adapting between charging protocols for equipment to be charged via a bus, the method comprising:
    coupling a bus between a charging system and the equipment to be charged, wherein the equipment conforms to a first charging protocol that requires the bus to be energized before the equipment closes onto the bus, and wherein the charging system conforms to a second charging protocol that does not energize the bus before the equipment closes onto the bus;
    drawing energy from an analog control line of the charging system; and
    energizing the bus using the drawn energy before the equipment closes onto the bus.

9. The method of claim 8, further comprising perform handshaking between the equipment and charging equipment before the equipment closes onto the bus.

10. The method of claim 8, wherein the analog control line includes a charger start/stop connector.

11. An inter-protocol charging adapter for a vehicle to be charged via a bus, the adapter comprising:
    first connectors corresponding to a first charging protocol that requires the bus to be energized before the vehicle closes onto the bus, the first connectors including: (i) at least two power supplies coupled to a battery of the vehicle, (ii) a ground, (iii) a proximity connector, and (iv) a pilot connector;
    second connectors corresponding to a second charging protocol that does not energize the bus before the vehicle closes onto the bus, the second connectors including: (i) at least two power supplies coupled to a charging system and to the bus, (ii) a ground connector, (iii) at least two charger start/stop connectors, (iv) a proximity connector, (v) a charging start/stop connector, and (vi) at least two controller area network (CAN) connectors;
    a boost converter coupled to the bus and to at least one of the charger start/stop connectors; and
    a processor that causes the boost converter to draw energy from the charger start/stop connector and use the drawn energy to energize the bus before the vehicle closes onto the bus.

12. The inter-protocol charging adapter of claim 11, wherein the processor is configured to perform handshaking between the vehicle and the charging system.

13. The inter-protocol charging adapter of claim 11, further comprising a diode in the bus.

14. The inter-protocol charging adapter of claim 11, incorporated in a single housing.

15. The inter-protocol charging adapter of claim 11, distributed over at least two housings connected by a cable.

16. The inter-protocol charging adapter of claim 11, wherein the charging equipment is configured for dual-wire CAN communication and the vehicle is configured for single-wire CAN communication, the adapter further comprising: a dual wire CAN component coupled to the at least two CAN connectors, and a single wire CAN component coupled to the vehicle, wherein the processor translates between dual-wire CAN communications and single-wire CAN communications.

* * * * *